(12) United States Patent
Kern et al.

(10) Patent No.: US 6,336,187 B1
(45) Date of Patent: Jan. 1, 2002

(54) STORAGE SYSTEM WITH DATA-DEPENDENT SECURITY

(75) Inventors: Robert Frederic Kern; Mark Anthony Sovik, both of Tucson, AZ (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/096,962

(22) Filed: Jun. 12, 1998

(51) Int. Cl.[7] .................................................. G06F 1/24
(52) U.S. Cl. ........................ 713/161; 713/165; 713/168; 713/200
(58) Field of Search ...................... 713/161, 168, 713/200, 165, 166, 193; 705/54; 707/9; 711/164

(56) References Cited

U.S. PATENT DOCUMENTS

| | | | |
|---|---|---|---|
| 4,322,576 A | | 3/1982 | Miller ..................... 178/22.07 |
| 4,423,287 A | | 12/1983 | Zeidler .................... 178/22.08 |
| 4,888,800 A | | 12/1989 | Marshall et al. .............. 380/21 |
| 4,947,318 A | * | 8/1990 | Mineo ......................... 713/200 |
| 5,070,528 A | | 12/1991 | Hawe et al. ................... 380/48 |
| 5,276,876 A | * | 1/1994 | Coleman et al. ............. 709/104 |
| 5,432,929 A | * | 7/1995 | Escola et al. ................... 707/9 |
| 5,436,972 A | * | 7/1995 | Fischer ......................... 380/286 |
| 5,455,863 A | | 10/1995 | Brown et al. .................. 380/23 |
| 5,469,556 A | * | 11/1995 | Clifton ......................... 711/163 |
| 5,557,765 A | | 9/1996 | Lipner et al. .................. 380/21 |
| 5,572,673 A | * | 11/1996 | Shurts ............................ 713/200 |
| 5,592,549 A | * | 1/1997 | Nagel et al. ................... 705/52 |
| 5,615,264 A | | 3/1997 | Kazmierczak et al. .......... 380/4 |
| 5,633,934 A | | 5/1997 | Hember ......................... 380/50 |
| 5,678,046 A | * | 10/1997 | Cahill et al. ................. 707/200 |
| 5,748,744 A | * | 5/1998 | Levy et al. ...................... 380/52 |
| 5,857,021 A | * | 1/1999 | Kataoka et al. ................ 705/54 |
| 5,922,073 A | * | 7/1999 | Shimada ........................ 713/200 |
| 5,996,075 A | * | 11/1999 | Matena .......................... 713/200 |
| 5,999,930 A | * | 12/1999 | Wolff ................................ 707/8 |

OTHER PUBLICATIONS

A. V. Le et al., "Method for Authenticating Key Data Set Records Using Message Authentication Codes", IBM Technical Disclosure Bulletin, vol. 34, No. 9, pp. 104–108, Feb. 1992.

* cited by examiner

Primary Examiner—Thomas R. Peeso
(74) Attorney, Agent, or Firm—Dan Hubert & Associates

(57) ABSTRACT

A host-independent storage facility selectively provides data-dependent security by initially storing a security key in association with a storage region, where that key must be presented by any host seeking access to the region. The storage system includes a storage controller coupled to a digital data storage and one or more hosts. Initially, the controller receives a set-access-key command from one of the hosts, identifying a storage region, an operation parameter identifying prohibited types of storage operations, and a reference access key. The controller stores the access key and the operation parameter in a reference location associated with the identified storage region. Later, the controller may receive storage access requests from the hosts. Requests include an identification of a requested storage region, an access type, and an input access key. In response, the controller retrieves the reference access key and operation parameter associated with the requested storage region. If the requested access type is not prohibited by the operation parameter, the controller executes the storage access request. Also, if the requested access type is prohibited by the retrieved operation parameter, the controller nonetheless executes the storage access request if the input and reference access keys match.

17 Claims, 5 Drawing Sheets

STORAGE SYSTEM WITH DATA-DEPENDENT SECURITY

BACKGROUND OF THE INVENTION

1. Field of the Invention

The present invention relates to a digital data storage system with data dependent, rather than user dependent, storage security. More particularly, the invention concerns a data dependent storage facility implemented by a host-independent storage controller that selectively provides security for storage regions by initially storing access keys in association with the regions, where any host seeking access to the region must present the associated key.

2. Description of the Related Art

In many different working environments, there is a need to store great amounts of data. Consequently, mass data storage systems are more popular today than ever. Mass storage systems are implemented in magnetic tape drives, optical disks, magnetic "hard" disk drives, and the like. One commercially available mass storage system is the RAMAC storage subsystem, manufactured and sold by International Business Machines Corp. (IBM).

To get the most out of their mass storage systems, system administrators often configure a common storage for access by multiple different users. The common storage is often coupled to individual user computers by a server machine implementing a local or wide area network. The common storage may be a single device, but more often comprises many different physical storage devices. Some examples of multi-user mass storage systems are: (1) corporate Intranet systems accessed by employee users, (2) telephone records accessible by telephone operators (users) located around the state, nation, or world, (3) banking records accessed by remote customers (users) operating automatic teller machines, and (4) engineering design specifications or models accessed by engineers (users) working together on a technical project. A variety of other arrangements are also known.

In these systems, security of common storage is one difficult challenge facing storage system engineers. Since the common storage is effectively coupled to all users (via intermediate server machines), it is often necessary to consider the user's identity in deciding whether to provide (or deny) access to stored data. Some data may be suitable for all users to access, whereas other data may be only suitable for access by selected users. As an example, it may be desirable to provide all employees of the company access to the company's telephone directory stored on a common storage facility, while making personnel files available only to those in the human resources department.

Many known data security mechanisms address the security problem by operating a central host or server as an access gate. This is feasible since the server alone is attached to the common storage, therefore constituting a natural gate. In this arrangement, all access requests are routed through this server, which accepts or rejects each request according to the identity of the requesting user and the content of the request. The server implements its security features by running a security software program. As one variation of this arrangement, there may be multiple servers coupled to the common storage, with each server running the same security program under the same operating system. For example, each server may comprise an IBM model S/390 product using the MVS operating system, where each server is coupled to a RAMAC storage subsystem.

Although these storage configurations have proven satisfactory in many cases, they are not completely satisfactory for some users. In particular, system expense can be high because of the need to purchase dedicated server machines. As an alternative, it can be more cost efficient to operate an existing host machine as the security gate, in addition to its existing functions in the system. However, this places a substantial burden on the host, making the host a bottleneck for user access of the common storage. In addition, the host's security duties retard unrelated application programs running on the host.

To relieve security duties of a common host or server, some systems couple each user or host computer directly to a component of the common storage, such as a storage controller, and shift security duties to the hosts. Advantageously, this direct-connect arrangement eliminates the cost of a central server. To uphold a consistent, universal security plan, each host in this arrangement must be running the same security program; regardless of which machine is accessing the common storage, access of each dataset must be limited to the same set of users. This approach is useful when all hosts use the same operating system, and can easily run identical security programs.

However, this configuration is not practical when the user/host computers employ a variety of incompatible operating systems. This situation is especially likely today because there are many different makes of computer, with each being particularly suited to certain applications. For example, access to common storage may be sought by all of the following machines: a WINDOWS based personal computer, a SUN workstation, a UNIX based computer, and a MVS based mainframe computer. With incompatible user/host machines, this direct-connect environment is unworkable because of the difficulty in implementing the identical security programs on the diverse platforms.

In summary, even though the foregoing arrangements constitute significant advances and may even enjoy widespread commercial success today, there are not completely adequate for some applications due to some unsolved problems.

SUMMARY OF THE INVENTION

Broadly, the present invention concerns a storage system with storage security that is provided according to the storage region being accessed, rather than the user. The storage system of the invention selectively provides security for storage regions by initially storing an access key in association with the region, where that key must be presented by any host seeking access to the region.

The storage system includes a storage controller coupled to a digital data storage and one or more host computers. Initially, one of the hosts receives an allocate command from an application program, user, or other source. A reference access key of the allocate command is provided (generated) by the application requesting the storage allocation. The host allocates the requested storage and also issues a set-access-key demand to the controller. This command identifies the type of access protection (read, read/write), the storage region to be protected, and the reference access key to be used by the controller in gating access to the associated storage region. If the controller receives no set-access-key request for a given storage range, then the controller will not require any access key before accepting read or write operations involving that storage region.

Later, the controller may receive storage access requests from the hosts. Each request includes an identification of the requested storage region, an access type, and (if necessary) an input access key. In response, the controller retrieves any reference access key and access type information associated with the identified storage region. If the storage region is access-key protected and the requester provided a matching key, then the operation is allowed. If the keys don't match (i.e., wrong key or no key provided), then the controller determines if the requested operation is protected; if not, the operation is allowed. If the operation is protected and the keys do not match, the operation is failed, and an error condition may be returned to the requesting host.

In one embodiment, the invention may be implemented to provide a method to provide security for storage regions by initially storing a security key in association with the region, where that key must be presented by any host seeking access to the region. In another embodiment, the invention may be implemented to provide an apparatus, such as a data storage system, providing storage security. In still another embodiment, the invention may be implemented to provide a signal-bearing medium tangibly embodying a program of machine-readable instructions executable by a digital data processing apparatus to perform method steps for providing storage security.

The invention affords its users with certain distinct advantages. Advantageously, the invention provides data-dependent security implemented in a storage controller, enabling a variety of different host computers to have access to a common storage facility. With the invention, the hosts may run incompatible operating systems without sacrificing storage security. As another benefit, the invention is inexpensive because it implements data security measures using a storage controller rather than a separate server machine. Similarly, the invention does not burden the processing and input/output resources of existing host machines with security functions. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a data dependent storage facility implemented by a host-independent storage controller that selectively provides security for storage regions by initially storing a security key in association with the region, where that key must be presented by any host seeking access to the region.

Hardware Components & Interconnections
Storage System Overall Structure

Figure 1:
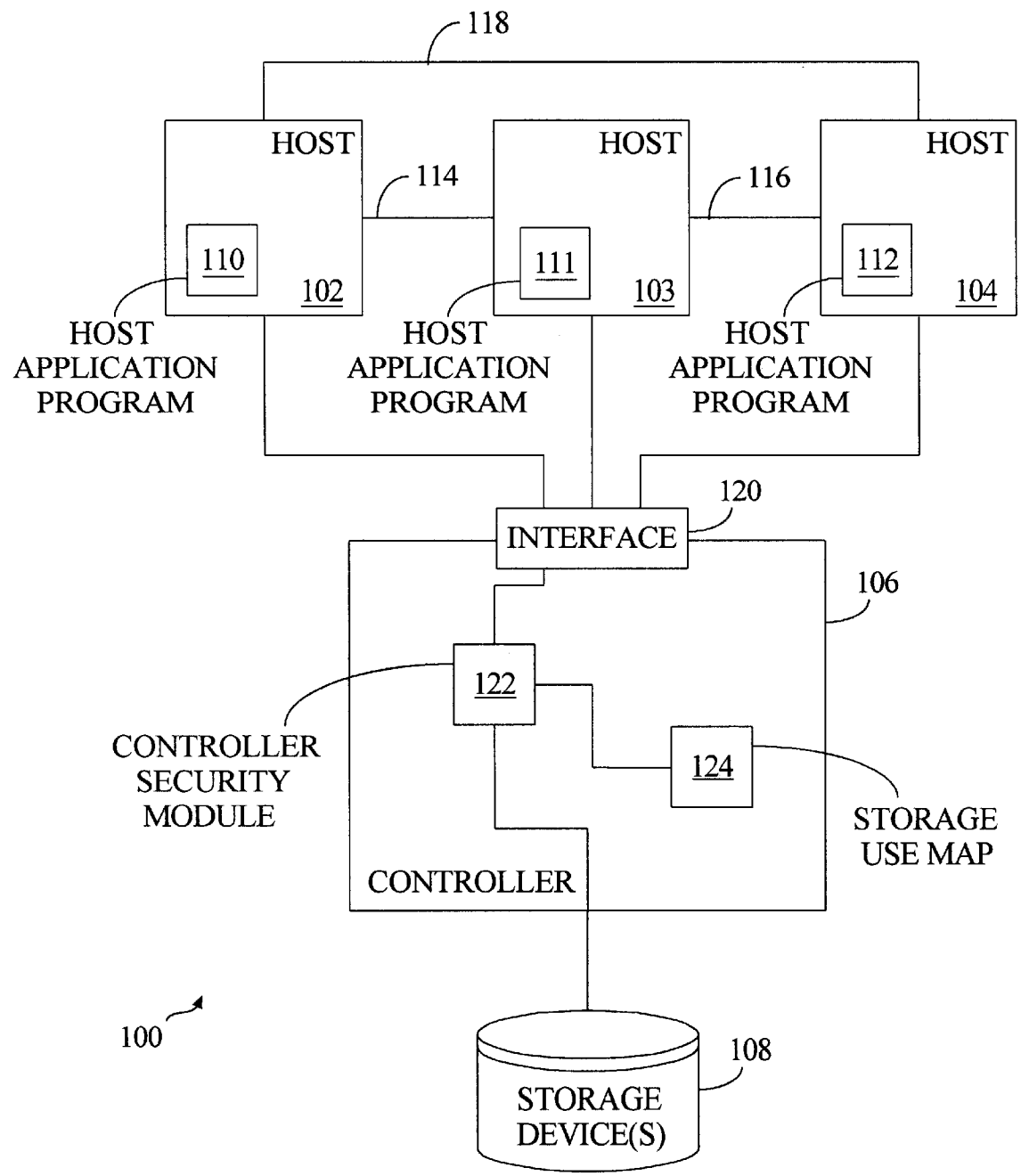
FIG. 1 is a block diagram of the hardware components and interconnections of a data storage system in accordance with the invention.

One aspect of the invention concerns a data storage system, which may be embodied by various hardware components and interconnections as shown by the system 100 of FIG. 1. The system 100 includes multiple hosts 102–104, a controller 106, and one or more storage devices 108 ("storage"). The hosts 102–104 are coupled to the controller 106, and may also be coupled to each other by links 114–118. The hosts include respective host application programs 110–112.

p Hosts

Among other functions, the application programs 110–112 generate "storage access requests" seeking access to the storage 108. "Access" includes various types of operations, such as reading data from the storage 108, writing data to the storage 108, and the like. In the presently illustrated example, each storage access request includes the following components:

1) Identification of a target storage region, within the storage 108.
2) A requested access type, e.g., read or write.
3) If the requested access type is "write", data to be written.
4) An input access key, which is used by the controller 106 to determine whether the requesting application program should have access to the requested storage region.

The hosts 102–104 may comprise various hardware devices suitable to generate storage access requests, such as personal computers, mainframe computers, computer workstations, supercomputers, or other suitable machines. As in the illustrated embodiment, the hosts 102–104 may be running respective application programs 110–112, from which the need for storage access arises. According to one advantage of the invention, the hosts 102–104 may be running a variety of different operating systems (not shown), which may even be incompatible with each other. Some exemplary operating systems include MVS, UNIX, WINDOWS NT, etc.

The hosts 102–104 may be interconnected by communications links 114, 116, 118, such as wires, cables, fiber optic lines, wireless links, satellite, telephone lines, etc. Although not shown, the hosts 102–104 may include respective interfaces, such as ESCON links, small computer system interfaces (SCSIs), etc. The hosts 102–104 are also coupled to the controller 106 via a controller interface 120, such as an intelligent digital input/output communication channel, or other interface suitable to the particular application.

Controller

Generally, the controller 106 serves to receive storage access requests from the hosts 102–104 and implement them by passing appropriate commands to the storage 108. According to the invention, the controller 106 additionally operates as a gate, selectively accepting or refusing hosts' access requests by implementing a data security scheme. Since this scheme is implemented by the controller 106 rather than one or more hosts 102–104, the hosts are available for other tasks. Additionally, the controller's centrality and independence from the hosts 102–104 is conductive to access by hosts of many different operating systems.

The controller 106 includes a controller security module 122, which performs the controller's security functions. The security module 122 may comprise a hardware component, such as one or more computers, microprocessors, or other digital data processing apparatus. Alternatively, the security module 122 may be an application program comprising a sequence of programming instructions executed by one or more processors of the controller 106. As an example, the controller 106 may be implemented by an IBM RAMAC controller, where the storage 108 comprises a RAMAC magnetic disk drive storage system.

Generally, before granting storage access to the hosts 102–104, the controller's gating function requires it to consult a "reference location" containing various information about storage regions in the storage 108. The controller 106 evaluates information in the reference location against contents of the storage access request to determine whether the request should be permitted. The contents and use of the reference location are discussed in greater detail below.

The reference location constitutes storage space accessible to the controller 106, and may be provided by data stored at the controller 106, as illustrated by the storage use map 124. Table 1 (below) depicts an example of the storage use map 124, in the form of a lookup table.

TABLE 1

Exemplary Storage Use Map

| STORAGE ACCESS REGION | REFERENCE ACCESS KEY | OPERATION PARAMETER |
|---|---|---|
| 00001 | 1 | WRITE |
| 00002 | 1 | WRITE |
| 00003 | 1 | WRITE |
| 00004 | NONE | NO SECURITY |
| 00005 | NONE | NO SECURITY |
| 00006 | 2 | READ/WRITE |
| 00007 | 2 | READ/WRITE |
| 00008 | NONE | NO SECURITY |

In the example of Table 1, the "storage access region" column identifies storage regions in the devices 108. The "reference access key" lists an access key with which the input access key must match in order for the storage access request to succeed. In this simplified example, reference access keys of "1" and "2" are provided for ease of explanation. For each storage access region, the associated "operation parameter" designates operations that are prohibited without the requesting host's application program submitting an input access key that matches the prescribed reference access key. As a variation, Table 1 may be condensed by listing abbreviated pointers to other storage locations that contain the actual values of storage access region, reference pointer, and/or operation parameter. Furthermore, Table 1 may be encrypted by controller 106 to secure the access key from accidental/malicious access.

As an alternative to the storage use map 124, the reference location may be located in another location, such as the storage 108 itself. For example, as discussed more thoroughly below, certain reference data associated with each storage region in the devices 108 may be stored in the actual storage region itself. Furthermore, whether stored in the controller 106, storage 108, or elsewhere, the reference location may be provided by a variety of other data structures, such as linked lists, relational databases, lookup tables, etc.

Storage

As explained above, the storage 108 serves to store user data in the system 100, and may also contain one or more reference locations containing security data. The storage 108 may be implemented by one or more storage devices of various types, such as magnetic disk drive, magnetic tape, optical disk, optical tape, semiconductor memory, or any other suitable digital data storage medium. The storage 108 may be configured as a single "logical" device, where data is actually stored on separate physical devices. As a specific example, the storage 108 may be implemented by an IBM RAMAC disk drive system, of which the controller 106 is one component.

Exemplary Digital Data Processing Apparatus

Another aspect of the invention concerns a digital data processing apparatus, implementing a host-independent storage facility that selectively provides data-dependent access by initially storing an access key in association with a storage region, where that key must be presented by any host seeking access to the region. This apparatus may be embodied by various hardware components and interconnections, and may be implemented by the controller 106, for example.

Figure 2:
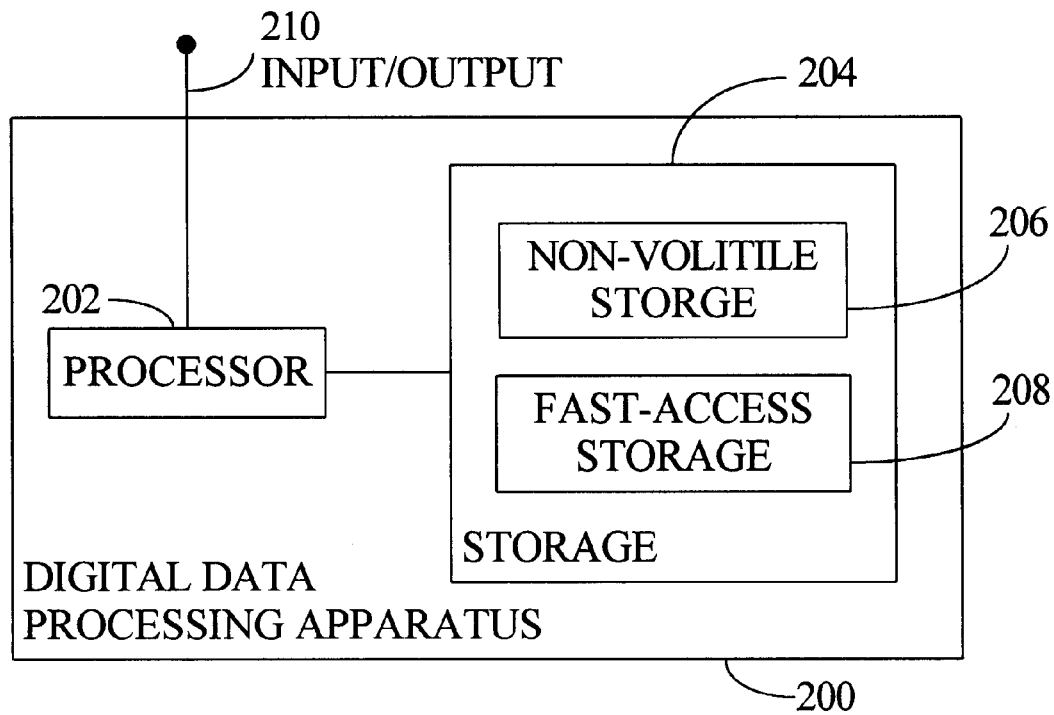
FIG. 2 is a block diagram of a digital data processing machine in accordance with the invention.

FIG. 2 shows an example of one digital data processing apparatus 200. The apparatus 200 includes a processor 202, such as a microprocessor or other processing machine, coupled to a storage 204. In the present example, the storage 204 includes a fast-access storage 208, as well as nonvolatile storage 206. The fast-access storage 208 may comprise random access memory, and may be used to store the programming instructions executed by the processor 202. The nonvolatile storage 206 may comprise, for example, one or more magnetic data storage disks such as a "hard drive", a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Operation

In addition to the various hardware embodiments described above, a different aspect of the invention concerns a data dependent storage facility implemented by a host-independent storage controller that selectively provides security for storage regions by initially storing an access key in association with the region, where that key must be presented by any host seeking access to the region.

Signal-Bearing Media

In the context of FIGS. 1–2, such a method may be implemented, for example, by operating the controller 106, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to provide security for storage regions by initially storing an access key in the region, where that key must be presented by any host seeking access to the region.

Figure 3:
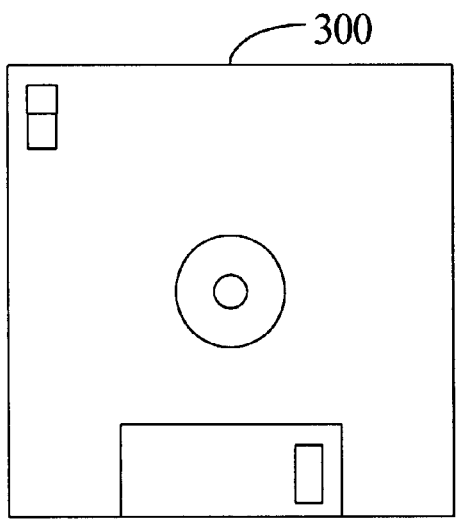
FIG. 3 shows an exemplary signal-bearing medium in accordance with the invention.

This signal-bearing media may comprise, for example, RAM (not shown) contained within the controller 106, as represented by the fast-access storage 206. Alternatively, the instructions may be contained in another signal-bearing media, such as a magnetic data storage diskette 300 (FIG. 3), directly or indirectly accessible by the processor 202. Whether contained in the storage 204, the diskette 300, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Allocating Storage

Figure 4:
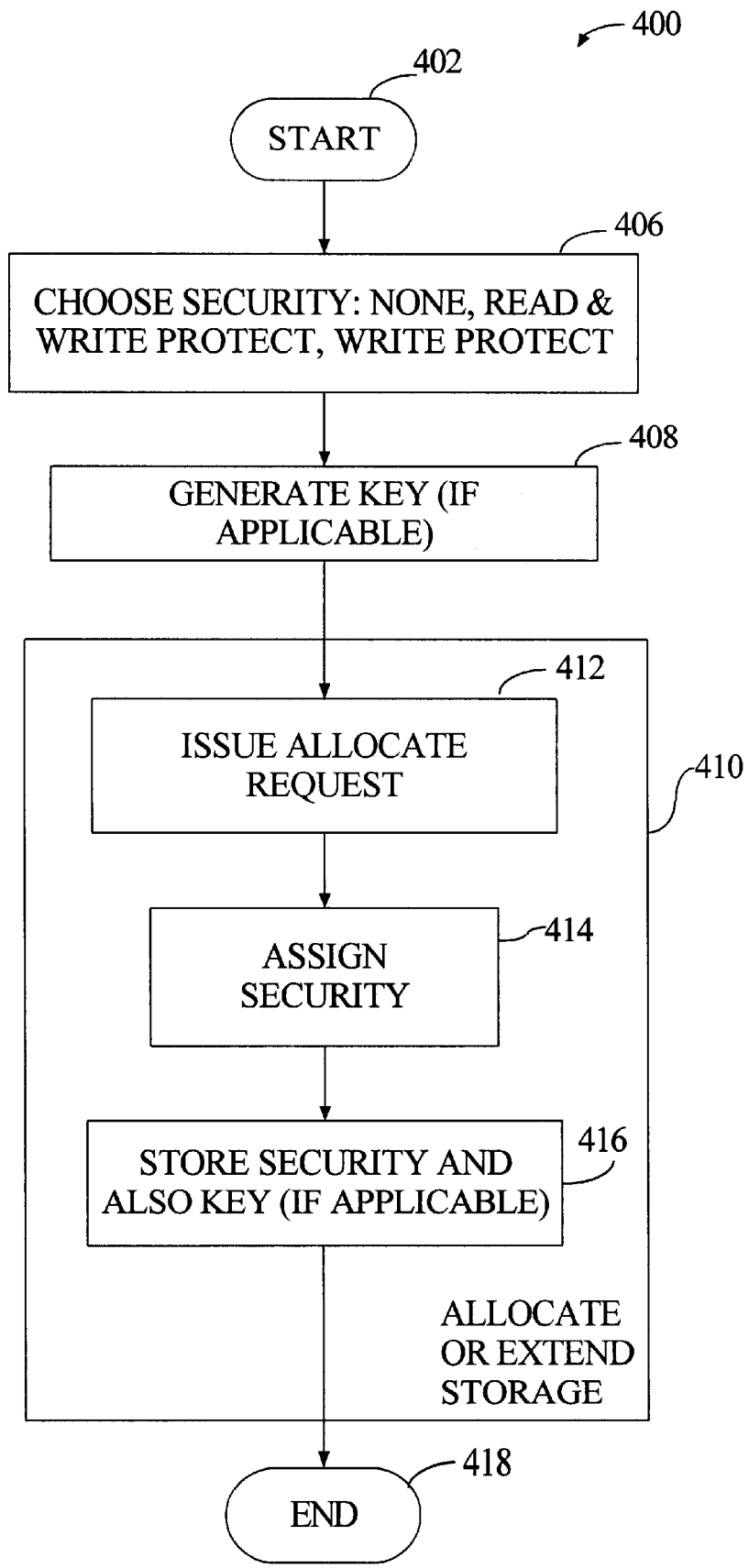
FIG. 4 is a flowchart showing operations performed to allocate data storage according to the invention.

FIG. 4 shows a sequence 400 performed to allocate space in the storage 108 according to the invention. For ease of explanation, but without any limitation intended thereby, the example of FIG. 4 is described in the context of the environment described above in FIGS. 1–3. The sequence is initiated in step 402, when one of the application programs 110–112 issues a request to its respective host 102–104 to allocate storage space. The allocation request may specify relevant aspects of the allocation operation, such as the type of storage device to be used (if the storage 108 contains different storage modes), etc. Allocated storage "regions" may correspond to any convenient unit of granularity, such as a disk sector, disk track, disk "extent", volume, address range, block, tape track, file, dataset, etc. Storage regions may also have user-specified sizes, in which event this additional characteristic may be included in the allocation request. If desired, one or more storage regions may comprise subsets of a larger data structure, such as a database, file, storage group, dataset, etc; advantageously, this embodiment facilitates different levels of security for subsets of a larger data structure.

In step 406, the application program 110–112 sets a desired level of security for the allocated storage. The types of security are also called "operation parameters", and in this example include (1) read and write prohibited, (2) write prohibited, and (3) no security, which may be a default value if no operation parameter is specified. With a read and write prohibited operation parameter, the controller 106 will prevent hosts from reading or writing the associated storage region unless the host presents a required access key. With a write prohibited region, as discussed in greater detail below, the controller 106 will prevent hosts from writing the storage region unless the host presents a required access key. Hosts may still read data from this storage region without presenting the associated access key. All hosts can freely read and write data from/to "no security" storage regions.

After step 406, the application program 110–112 generates an access key if some type of security was selected in step 406. This key constitutes a "reference" access key, to be stored in the reference location and used to evaluate future host access requests to this storage region, as explained below. The key may comprise an alphabetic, numeric, alphanumeric, or other machine-readable code that is unique with respect to other storage regions' access keys. As an example, the access key may comprise a 256-bit digital number, selected in accordance with a public key encryption scheme, used as discussed below. If the present storage allocation request seeks to extend an already-allocated storage region, step 408 may use the region's existing key instead of generating a new one.

After step 408, step 410 carries out the requested allocation operation. In step 412, the application 110–112 issues an allocation command to the host 102–104, commanding the host 102–104 to assign security and access key to a storage region of the appropriate size. In step 414, the host 102–104 assigns a storage region for the requesting application 110–112 and carries out the requested allocation by representing that storage region's allocation in a storage map (not shown). In addition, the host directs the controller 106 to associate the provided operation parameter (security level) and access key with the defined storage region. The host 102–104 may provide its directions to the controller 106, for example, by issuing a set-access-key command, which specifically directs the controller 106 to associate the access key and operation parameter with the allocated storage region.

Following step 414, in response to the host's set-access-key command, the controller 106 stores the operation parameter and reference access key in a prescribed reference location, in association with the allocated storage region. As mentioned above, one example of the reference location is the storage use map 124; in this embodiment, the controller 106 in step 416 stores the reference access key and operation parameter in the map 124. In another example, the reference location may comprise storage space in the allocated storage region itself; in this example, step 416 involves storing these items in the allocated storage region. For example, they may be stored at the first address of the allocated storage region, in a header, in a prefix or suffix, or in another easily retrievable location.

After step 416, the requested allocation is complete, and the sequence 400 ends in step 418. The allocated storage region is now available for access by the hosts 102–104.

Host Initiation of Storage Access Request

Figure 6:
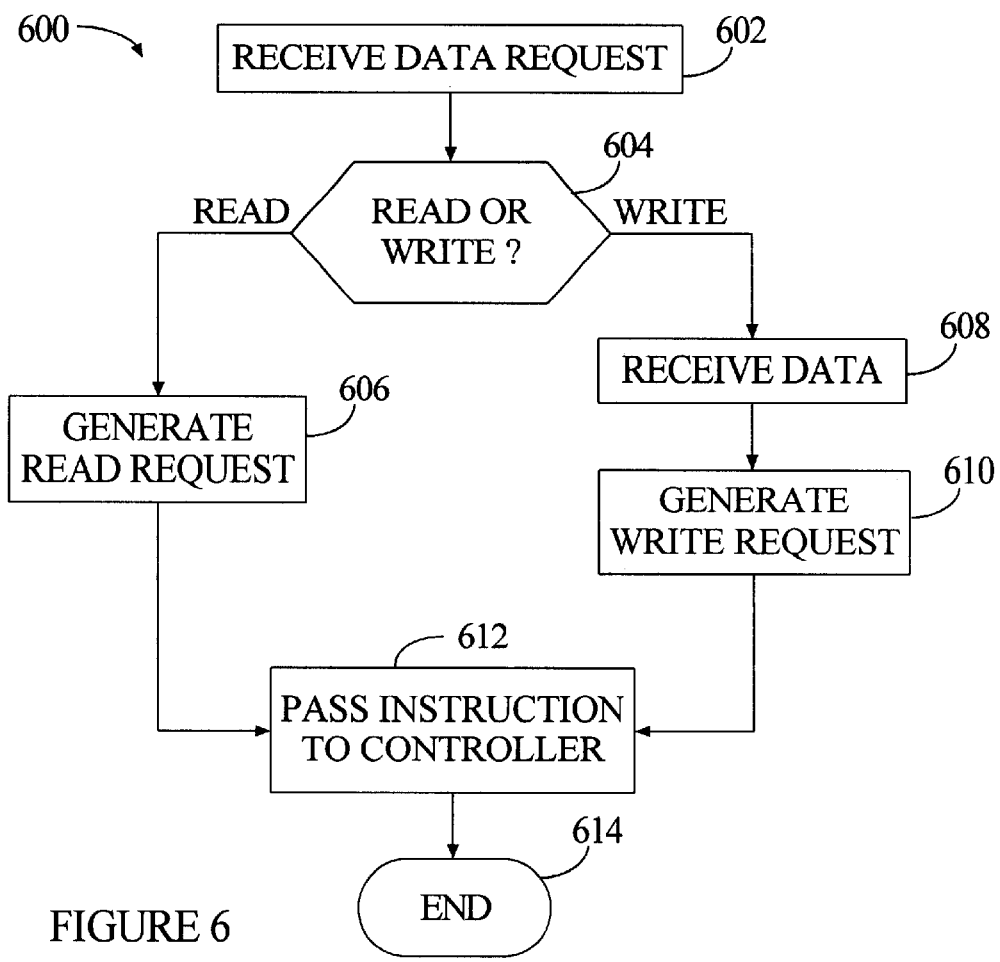
FIG. 6 is a flowchart showing host operations performed to initiate a storage access operation according to the invention.

FIG. 6 shows a sequence 600 performed by an application 110–112 to initiate access of the storage 108. In response to these operations, as discussed below, the controller 106 performs various tasks to carry out the storage access. For ease of explanation, but without any limitation intended thereby, the example of FIG. 6 is described in the context of the environment described above in FIGS. 1–3. In this example, the sequence 600 is executed by the application program (e.g. 110–112) of the requesting host.

The sequence 600 begins in step 602 when the application program of the requesting host receives a data request. This request, for example, may constitute a request to read data from the storage 108 or store data to the storage 108. In the illustrated example, the data request may be received from a source such as another application program of the requesting host, a user terminal or other input device (not shown) coupled to the host, another computer coupled to the host, etc.

In response to the data request of step 602, the application program determines whether the data request is a "read" or "write" in step 604. After step 604, the application program generates an appropriate storage access request in step 606 or steps 608–610.

Namely, if the request is a "read", the application program in step 606 generates a read request in the form of a storage access request. If the request is a "write", the application program receives the data to be written in step 608, and then generates the write request in step 610.

In either case, the storage access request in this example includes the following components:

1) Identification of a target storage region, within the devices 108. This component may come with the data request received by the application program, e.g., identification of a particular storage device or partition, etc. As an alternative, the target storage region may be particularly identified by the application program or another facility of the host, for example.
2) A requested access type, e.g., read or write. This component is determined by step 604, discussed above.

3) If the requested access type is "write", data to be written. This component comes from step 608.
4) An "input" access key, which will be used by the controller 106 to determine whether the requesting host should have access to the requested storage region. As one example, the input access key may be provided to the requesting host's application program by the original source of the data request (step 602 ). If the storage access request does not seek access to storage space for which the requested operation type is otherwise prohibited, the input access key may be omitted.

Figure 5:
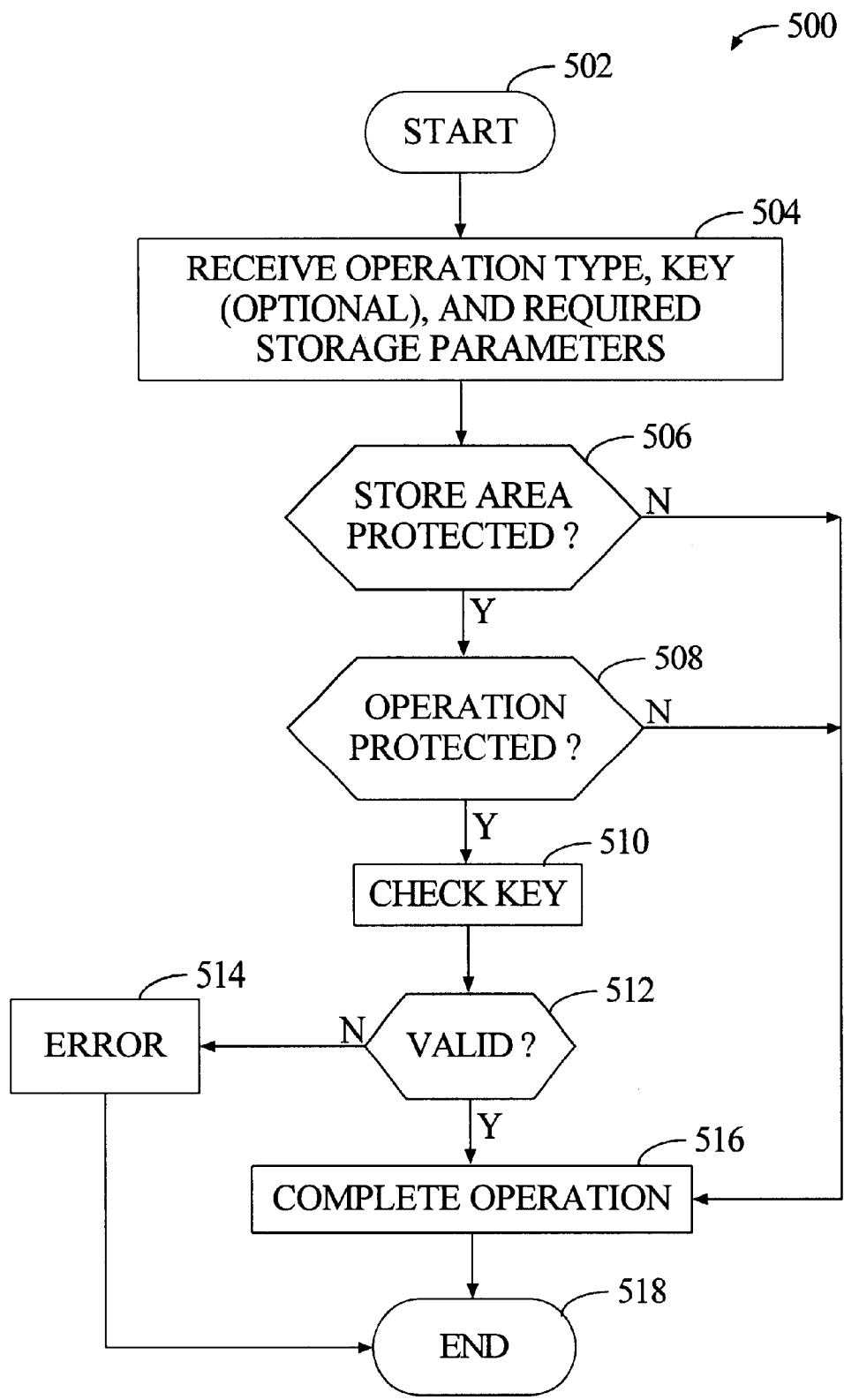
FIG. 5 is a flowchart showing controller operations performed to process a storage access request according to the invention.

After step 606 or 610, the application program in step 612 passes the generated storage access request to the controller 106. Passage may occur, for example, through the requesting host's operating system. Following step 612, the sequence 600 ends in step Controller Gating in Response to Host Storage Access Request FIG. 5 shows a sequence 500 performed by the controller 106 in response to the requesting host's storage access request, which the host submitted to the controller 106 in step 612 (FIG. 6). For ease of explanation, but without any limitation intended thereby, the example of FIG. 5 is described in the context of the environment described above in FIGS. 1–3. In this example, the controller's actions are executed by the security module 122.

The sequence 500 begins in step 502, which may occur when the controller 106 is powered up or otherwise activated. In step 504, the controller 106 receives the storage access request submitted by the requesting host (step 612, FIG. 6). As mentioned above, the storage access request includes identification of a target storage region, an operation type, write data (if the operation type is "write"), and an input access key (if the operation requests access that is otherwise prohibited).

In response to step 504, the controller 106 determines whether target storage region is protected, i.e., whether a reference location associates a reference access key with the target storage region. In the illustrated hardware environment, this is performed by the controller 106 consulting the storage use map 124. If the target storage region does not have an associated reference access key, this area has no security protection and further analysis is unnecessary. In this case, the routine 500 passes from step 506 to step 516, where the controller 106 directs the storage 108 to complete the requested operation. Following step 516, the sequence 500 ends in step 518.

If the target storage region is protected, however, step 506 advances to step 508. In step 508 the controller 106 determines whether the requested operation type is protected. Namely, the controller 106 consults the reference location to retrieve the operation parameter associated with the target storage region, and thereby determine which operation types are prohibited without submittal of the reference access key. In the illustrated hardware environment, step 508 is performed by the controller 106 consulting the storage use map 124 to determine whether the requested operation type (received in step 504 ) is prohibited. If the requested operation type is not prohibited, step 508 advances to step 516, where the controller 106 directs the storage 108 to complete the requested operation in step 516, and then the sequence 500 ends in step 518.

If step 508 finds the requested operation type to be prohibited, however, the routine 500 advances to step 510. In step 510, the controller 106 checks the host-submitted input access key (received in step 504) against the reference access key (found in the reference location, e.g. storage use map 124 ). Step 510 involves comparing the input and reference access keys to see whether they match. If not, the input access key is not valid. In this case, the controller 106 returns an error condition to the requesting host in step 514. Otherwise, if the input access key matches the reference access keys, the input access key is valid, and the controller 106 directs the storage 108 to complete the requested operation in step 516. After steps 514 or 516, the sequence 500 ends in step 518.

As one enhancement to the embodiment described above, the controller 106 may direct the storage 108 to employ the reference access key in encoding or decoding data during the storage operation of step 516. In this embodiment, if the requested storage area is protected (i.e., it has an associated reference access key), and the host-submitted input access key is valid, the controller 106 uses the access key to encode or decode data involved in the storage access operation. The controller 106 may use either the input access key or the reference access key, since step 512 found them to be the same.

For example, if the requested operation type is a "read", the controller 106 uses the key to decode data from the requested storage region and then provides the decoded data to the requesting host. Analogously, if the requested operation type is a "write", the controller 106 uses the key to encode the write data supplied by the host and then stores the encoded data in the identified storage region. Encoding and decoding in this embodiment may use a number of different techniques that are well known to those in the relevant art. For instance, one useful technique is public key encryption. By using such encoding/decoding, stored data enjoys two levels of protection: (1) one level, by requiring the requesting host to submit a proper input access key to access the storage region, and (2) another level, by encoding data of the storage region with the key.

Activate New Host

Figure 7:
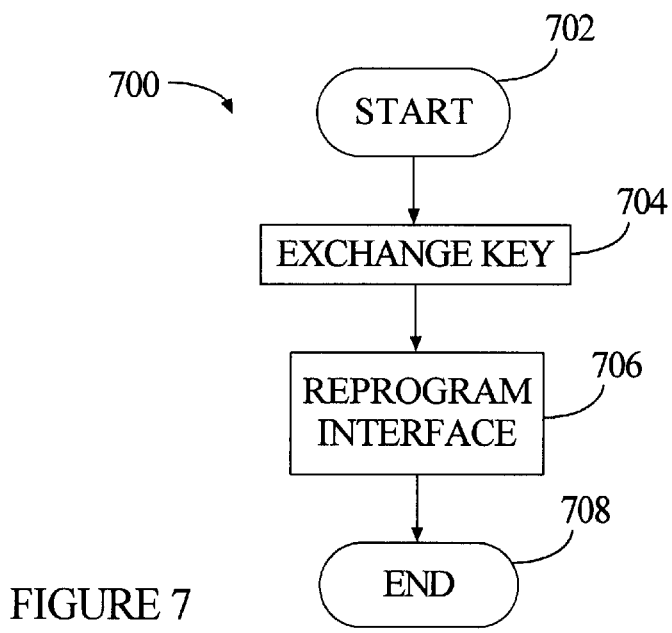
FIG. 7 is a flowchart operations performed by a new host to join the data storage system of the invention.

FIG. 7 shows a sequence 700 performed by a new host in order to join the system 100, and participate in future allocation and/or data access requests. For ease of explanation, but without any limitation intended thereby, the example of FIG. 7 is described in the context of the environment described above in FIGS. 1–3. Generally, to add a new host, an application program of the new host obtains access keys for the storage regions of future accesses. In addition, the new host must configure its own interface (not shown) with the controller 106 to properly communicate the contents of a storage access request.

More particularly, after the sequence 700 begins in step 702, the new host's application program 110–112 obtains one or more access keys from a source such as other hosts 102–104, the controller 106, user input, system administrator, etc. This step is optional, however, since there may be no need or intention for the new host to access storage regions that are already protected. A host-host exchange of access keys may be conducted over the links 114, 116,118, for example.

After step 704, the new host's application program reconfigures its interface with the controller in step 706. The new host's interface (not shown) may comprise an ESCON interface, small computer standard interface (SCSI), parallel or serial port, telephone modem, or any other digital data communications medium compatible with the particular embodiment of controller used in the system 100. In one example, the host interface may already be configured to receive storage access requests e.g., components such as identification of a target region, operation type, etc.; in this case, step 706 involves reconfiguring the host interface to accept submittal of input access keys in the future. In the case of an ESCON interface, this may involve adding a new channel command word, or modifying an existing channel command word to accept an input access key. In the case of a SCSI interface, the SCSI protocol is modified in step 706 to accept the input access parameter.

Bypass

Optionally, an internal setting may be provided within the controller 106 to bypass the data access storage key checking in certain predefined environments or events. For example, bypass may be desirable during disaster recovery, backup, data migration, and other operations.

Reset Access Key & Operation Parameter

As an additional enhancement to the foregoing embodiment, the controller 106 may additionally recognize a "reset-access-key" command issued by hosts 102–104. The reset-access-key command directs the controller 106 to alter the access characteristics of an allocated storage region. An illustrative reset-access-key includes the existing reference access key, along with a replacement reference key and/or operation parameter for the storage region. In response, the controller 106 validates the provided reference key, and then proceeds to update its reference location (e.g., storage use map 124 or storage region itself). Otherwise, if the host-submitted access key is invalid, the controller 106 fails the reset request.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A data security method for use in a storage system including a storage controller coupled to a digital data storage and one or more hosts, the storage containing one or more storage regions each associated with a reference access key, the storage also containing one or more storage regions without any associated reference access key, where the storage regions associated with reference access keys contain the associated reference access keys, the method comprising:

the controller receiving a storage access request from one of the hosts, the request including an identification of a requested storage region;

the controller determining whether the requested storage region is associated with a reference access key by reading at least some of the requested storage region to determine whether a reference access key is contained therein;

if the requested storage region is not associated with a reference access key, the controller executing the request;

if the requested storage region is associated with a reference access key, the controller determining whether the request includes an input access key matching the associated reference access key;

if the request includes a matching access key, the controller executing the storage access request;

if the request lacks a matching access key, the controller aborting the storage access request.

2. A data security method for use in a storage system including a storage controller coupled to a digital data storage and one or more hosts, the storage containing one or more storage region each associated with a reference access key, the storage also containing one or more storage regions without any associated reference access key, where the storage regions associated with reference access keys contain the associated reference access keys, the method comprising:

the controller receiving a storage access request from one of the hosts, the request including an identification of a requested storage region and an access type;

the controller determining whether the requested storage region is associated with a reference access key by reading at least some of the requested storage region to determine whether a reference access key is contained therein, and if the requested storage region is not associated with a reference access key, the controller executing the request;

if the requested storage region is associated with a reference access key, the controller retrieving an operation parameter associated with the requested storage region and identifying prohibited access types for the requested storage region, and if the requested access type is not prohibited, executing the storage access request;

if the requested storage region is associated with a reference access key and the requested access type is prohibited, the controller determining whether the request includes an input access log matching the reference access key, if the request lacks a matching access key, aborting the storage access request;

if the request includes a matching access key, the controller executing the requested storage access request.

3. A method for allocating space in a storage system including a storage controller coupled to a digital data storage and one or more hosts, the method comprising:

a first one of the hosts receiving an allocation request the allocation including:

an identification of a requested storage region;

a reference access key; and an operation parameter identifying prohibited types of storage operations involving the requested storage region;

the first host responding to the allocation request by allocating the requested storage region;

only if the operation parameter identifies one or more prohibited storage operations, the first host additionally issuing a set-access-key command to the controller; and in response to the set-access-key command the controller storing the reference key and the operation parameter in a reference location in association with the allocated storage region.

4. The method of claim 3, the reference location being in the allocated storage region.

5. The method of claim 3, the reference location being a storage use map stored outside the requested storage region and containing all allocated storage regions' operation parameters and reference access keys.

6. The method of claim 3, the method further comprising:

the controller receiving a storage access request from one of the hosts, the request including an identification of the requested storage region, an access type, and an input access key;

in response to the storage access request, the controller retrieving the reference access key and operation parameter; and only if the requested access type is not prohibited by the retrieved operation parameter or the input access key of the request matches the retrieved reference access key, the controller executing the storage access request, otherwise aborting the request.

7. A signal-bearing medium tangibly embodying a program of machine-readable instructions executable by a digital processing apparatus to perform a data security method in a storage system including a storage controller coupled to a digital data storage and one or more hosts, the storage containing one or more storage regions associated with access keys, the storage also containing one or more storage regions without associated access keys, where the storage regions associated with reference access keys contain the associated reference access keys, the method comprising:

the controller receiving a storage access request from one of the hosts, the request including an identification of a requested storage region;

the controller determining whether the requested storage region is associated with a reference access key by reading at least some of the requested storage region to determine whether a reference access key is contained therein, if the requested storage region is not associated with a reference access key, the controller executing the request;

if the requested storage region is associated with a reference access key, the controller determining whether the request includes an input access key matching the associated reference access key;

if the request includes a matching access key, the controller executing the storage access request;

if the request lacks a matching access key, the controller aborting the storage access request.

8. A signal-bearing medium tangibly embodying a program of machine-readable instructions executable by a digital processing apparatus to perform a data security method in a storage system including a storage controller coupled to a digital data storage and one or more hosts, the storage containing one or more storage regions each associated with a reference access key, the storage also containing one or more storage regions without any associated reference access key, where the storage regions associated with reference access keys contain the associated reference access keys, the method comprising:

the controller receiving a storage access request from one of the hosts, the request including an identification of a requested storage region and an access type;

the controller determining whether the requested storage region is associated with a reference access key by reading at least some of the requested storage region to determine whether a reference access key is contained therein, and if the requested storage region is not associated with a reference access key, the controller executing the request;

if the requested storage region is associated with a reference access key, the controller retrieving an operation parameter associated with the requested storage region and identifying prohibited access types for the requested storage region, and if the requested access type is not prohibited, executing the storage access request;

if the requested storage region is associated with a reference access key and the requested access type is prohibited, the controller determining whether the request includes an input access log matching the reference access key, if the request lacks a matching access key, aborting the storage access request;

if the request includes a matching access key, the controller executing the requested storage access request.

9. A signal-bearing medium tangibly embodying a program of machine-readable instructions executable by a digital processing apparatus to perform a method to allocate space in a storage system including a storage controller coupled to a digital data storage and one or more hosts, the method comprising:

a first one of the hosts receiving an allocation request including:

an identification of a requested storage region;

a reference access key; and an operation parameter identifying prohibited types of storage operations involving the requested storage region;

the first host responding to the allocation request by allocating the requested storage region;

only if the operation parameter identifies one or more prohibited storage operations, the first host additionally directing the controller to store the reference access key and the operation parameter in a reference location in association with the allocated storage region.

10. The medium of claim 9, the reference location being in the allocated storage region.

11. The medium of claim 9, the reference location being a storage use map stored outside the requested storage region and containing all allocated storage regions' operation parameters and reference access keys.

12. A data storage system accessible by one or more hosts, comprising:

a digital data storage containing one or more storage regions each associated with a reference access key, the storage also including one or more storage regions without any associated reference access key, where the storage regions associated with reference access keys contain the associated reference access keys;

a storage controller, coupled to the storage and the hosts, the controller being programmed to selectively provide access to the storage by performing a method comprising:

the controller receiving a storage access request from one of the hosts, the request including an identification of a requested storage region;

the controller determining whether the requested storage region is associated with a reference access key by reading at least some of the requested storage region to determine whether a reference access key is contained therein, if the requested storage region is not associated with a reference access key, the controller executing the request;

if the requested storage region is associated with a reference access key, the controller determining whether the request included an input access key matching the associated reference access key;

if the request includes a matching access key, the controller executing tire storage access request;

if the request lacks a matching access key, the controller aborting the storage access request.

13. A data storage system accessible by one or more hosts, comprising:

a digital data storage containing one or more storage regions each associated with a reference access key, the storage also containing one or more storage regions without any associated reference access key, where the storage regions associated with reference access keys contain the associated reference access keys; and a storage controller, coupled to the storage and the hosts, the controller being programmed to selectively provide access to the storage by performing a method comprising:

the controller receiving a storage access request from one of the hosts, the request including an identification of a requested storage region and an access type;

the controller determining whether the requested storage region is associated with a reference access key by reading at least some of the requested storage region to determine whether a reference access key is contained therein, and if the requested storage region is not associated with a reference access key, the controller executing the request;

if the requested storage region is associated with a reference access key, the controller retrieving an operation parameter associated with the requested storage region and identifying prohibited access types for the requested storage region, and if the requested access type is not prohibited by the operation parameter, executing the storage access request;

if the requested storage region is associated with a reference access key and the requested access type is prohibited by the operation parameter, the controller determining whether the request includes an input access key matching the reference access key, if the request lacks a matching access key, aborting the storage access request;

if the request includes a matching access key, the controller executing the requested storage access request.

14. A data storage system accessible by one or more hosts, comprising:

a digital data storage; and one or more hosts coupled to the storage via a storage controller, each host being programmed to allocate space in the storage by:

the host receiving an allocation request including:
an identification of a requested storage region;
a reference access key; and
an operation parameter identifying prohibited types of storage operations involving the requested storage region;

in response to the allocation request, the host allocating the requested storage region;

only if the operation parameter identifies one or more prohibited storage operations, the host issuing a set-access-key command to the controller;

the storage controller, programmed to respond to the set-access-key by storing the reference access key and the operation parameter in a reference location in association with the allocated storage region.

15. The system of claim 14, the reference location being in the requested storage region.

16. The system of claim 14, the reference location being a storage use map stored outside the requested storage region.

17. The system of claim 14, the controller being further programmed to process storage access requests by:

the controller receiving a storage access request from one of the hosts, the request including an identification of the requested storage region, an access type, and an input access key;

in response to the storage access request, the controller retrieving the reference access key and operation parameter;

only if the requested access type is not prohibited by the retrieved operation parameter or the input access key of the request matches the retrieved reference access key, the controller executing the storage access request, otherwise aborting the request.

* * * * *

UNITED STATES PATENT AND TRADEMARK OFFICE
CERTIFICATE OF CORRECTION

PATENT NO. : 6,336,187 B1
DATED : January 1, 2002
INVENTOR(S) : Kern et al.

It is certified that error appears in the above-identified patent and that said Letters Patent is hereby corrected as shown below:

Column 12,
Line 2, change "storage region" to -- storage regions --.

Column 14,
Line 66, change "tire" to -- the --.

Signed and Sealed this

Seventh Day of May, 2002

*Attest:*

*Attesting Officer*

JAMES E. ROGAN
*Director of the United States Patent and Trademark Office*